(12) United States Patent
Liu

(10) Patent No.: US 12,228,116 B2
(45) Date of Patent: Feb. 18, 2025

(54) BENT AXIS PLUNGER-TYPE VARIABLE HYDRAULIC MOTOR PUMP

(71) Applicant: BEIJING JODIN TECHNOLOGY CO. LTD, Beijing (CN)

(72) Inventor: Yanyang Liu, Beijing (CN)

(73) Assignee: BEIJING JODIN TECHNOLOGY CO. LTD, Beijing (CN)

( * ) Notice: Subject to any disclaimer, the term of this patent is extended or adjusted under 35 U.S.C. 154(b) by 50 days.

(21) Appl. No.: 18/245,580

(22) PCT Filed: Sep. 16, 2020

(86) PCT No.: PCT/CN2020/115632
§ 371 (c)(1),
(2) Date: Mar. 16, 2023

(87) PCT Pub. No.: WO2022/056738
PCT Pub. Date: Mar. 24, 2022

(65) Prior Publication Data
US 2023/0366393 A1    Nov. 16, 2023

(51) Int. Cl.
*F04B 1/00* (2020.01)
*F04B 1/146* (2020.01)
(Continued)

(52) U.S. Cl.
CPC ............... *F04B 1/00* (2013.01); *F04B 1/146* (2013.01); *F04B 1/148* (2013.01); *F04B 1/2092* (2013.01);
(Continued)

(58) Field of Classification Search
CPC ........ F04B 49/128; F04B 1/146; F04B 1/148; F04B 1/2092; F04B 1/32; F04B 1/328; F16C 29/0623
(Continued)

(56) References Cited

U.S. PATENT DOCUMENTS 3,168,846 A * 2/1965 Binns ...................... B23B 29/04
82/132
3,760,692 A * 9/1973 Molly .................. F01B 3/0035
91/505
(Continued)

FOREIGN PATENT DOCUMENTS

CN        2828357 Y      10/2006
CN       201106538        8/2008
(Continued)

OTHER PUBLICATIONS

International Search Report (English translation included) and the Written Opinion dated Mar. 26, 2021, in corresponding International Application No. PCT/CN2020/115632, 11 pages.

*Primary Examiner* — Christopher S Bobish
(74) *Attorney, Agent, or Firm* — Maier & Maier, PLLC

(57) ABSTRACT

A bent axis plunger-type variable hydraulic motor pump, including a cylinder body, a plunger, a ball connecting rod, a plunger spherical hinge, a multistage ball track spherical hinge shaft, a multistage ball track bearing ring, a retainer plate, an oil distributing plate, an oil distributing plate pin shaft, a suspension circle, a bushing bearing ring, a box bushing shaft, a box, a large variable ball connecting rod assembly, and a small variable ball connecting rod assembly. The large and small variable ball connecting rod assemblies are mounted on the box. The multistage ball track spherical hinge shaft is supported on the multistage ball track bearing ring, and a multistage rolling element holder in which a rolling element is provided is mounted in the multistage ball track spherical hinge shaft. Two ends of the ball connecting rod are hingedly connected to the multistage ball track spherical hinge shaft and the plunger.

6 Claims, 11 Drawing Sheets

(51) Int. Cl.
*F04B 1/148* (2020.01)
*F04B 1/2092* (2020.01)
*F04B 1/32* (2020.01)
*F04B 1/328* (2020.01)
*F04B 49/12* (2006.01)
*F04B 53/14* (2006.01)
*F16C 29/06* (2006.01)

(52) U.S. Cl.
CPC ............... *F04B 1/32* (2013.01); *F04B 1/328* (2013.01); *F04B 49/128* (2013.01); *F04B 53/144* (2013.01); *F16C 29/0623* (2013.01)

(58) Field of Classification Search
USPC .................................. 417/269; 91/197, 504
See application file for complete search history.

(56) References Cited

U.S. PATENT DOCUMENTS

| | | | | |
|---|---|---|---|---|
| 4,951,551 A * | 8/1990 | Arai | ........................ | F04B 1/328 91/506 |
| 5,094,144 A * | 3/1992 | Akasaka | ............... | F04B 1/2085 91/499 |
| 6,279,452 B1 * | 8/2001 | Moya | .................... | F04B 1/2014 91/506 |
| 6,378,413 B1 * | 4/2002 | Hoxie | ..................... | F04B 1/124 92/71 |
| 6,595,886 B1 | 7/2003 | Forster | | |
| 7,677,871 B2 * | 3/2010 | Gray | ....................... | F04B 1/328 91/197 |
| 10,047,734 B2 * | 8/2018 | Bergmann | .............. | F04B 1/148 |
| 10,151,305 B2 * | 12/2018 | Erlinger | ................ | F03C 1/0694 |
| 11,215,172 B2 * | 1/2022 | Kroneis | .................... | F04B 1/32 |
| 2015/0345483 A1 * | 12/2015 | Erlinger | .................... | F04B 1/24 91/499 |
| 2019/0249762 A1 | 8/2019 | Sugimoto et al. | | |

FOREIGN PATENT DOCUMENTS

| | | |
|---|---|---|
| CN | 201568242 U | 9/2010 |
| CN | 104234959 A | 12/2014 |
| DE | 3025593 | 2/1982 |
| JP | H03242472 | 10/1991 |
| JP | 2002349423 | 12/2002 |

\* cited by examiner

BENT AXIS PLUNGER-TYPE VARIABLE HYDRAULIC MOTOR PUMP

FIELD

The present application relates to the technical field of hydraulic motor pump, and in particular to an oblique-axis plunger type variable displacement hydraulic motor pump.

BACKGROUND

The specific power of hydraulic transmission is higher than that of fluid transmission, electric transmission and mechanical transmission. Especially, the specific power of axial plunger motor pump applied in hydraulic transmission is one order of magnitude higher. Despite such an advantage, it is seldom used in the transmission field.

The reason lies in that the current plunger type variable displacement hydraulic motor pump has the problems of short service life of bearing, low rotational speed, high internal leakage, low volumetric efficiency and low total efficiency.

Therefore, there is an urgent need to develop an oblique-axis plunger type variable displacement hydraulic motor pump that can improve the service life of bearing, increase the rotational speed, reduce the internal leakage, and improve the volumetric efficiency and total efficiency.

SUMMARY

The inventor found that a main pressure-loaded bearing has a short service life due to the very high energy density. The focus of the contradiction is that the sliding bearing has a strong load bearing capacity, but the linear speed is low; the improvement of the linear speed of the sliding bearing is a cutting-edge technology, in which Japan and Germany are in the lead, but the cost is very high; the use of hydrostatic bearing pump has a very high power consumption and is very demanding on the environment; due to the very large load ratio of the application environment, it is difficult for the conventionally designed rolling bearing to reduce the allowable stress of the material. Reducing an arc radius of raceway to improve the load-bearing capacity will increase the mismatch between the linear speed of rotation and the linear speed of revolution of a rolling body at different coordinate points where the rolling body contacts with the raceway, and the sliding friction phenomenon will lead to the problem of shortened service life of the bearing caused by power cycle of the rolling body itself, but the increase of load-bearing density is limited by the bearing space. Therefore, it is quite difficult to improve the load redundancy, resulting in the weak ability of hydraulic motor pump to resist transient high-pressure impact; moreover, the very short service life in the application environment of ideal energy density has become a technical bottleneck.

The inventor also found that increasing the rotational speed of axial plunger motor pump is a persistent problem that perplexes designers in the art. The intersection point of contradiction lies at a partition wall for high and low pressures of an oil distribution plate, where it is very difficult to provide a complete lubricating oil film, resulting in high linear speed scorching. How to solve the problem of scrap caused by high speed scorching here has become a technical bottleneck. The oil distribution plate must bear the axial pressure here; otherwise, after generation of gaps, the high pressure oil will not only flow into a low pressure oil chamber, but also will leak into a box, resulting in the reduction of volumetric efficiency; moreover, the high linear speed has to be borne when there is no gap. Therefore, the series of contradictory problems of lubrication, heat dissipation, material matching of the friction pair at a contact surface of the above position and cylinder block, PV value balance, and balancing the expansion coefficients of the parts to avoid the sticking and gripping problem in the process of heat conduction and heat exchange, as well as irregular changes of pressure, rotational speed, displacement and flow rate, have become difficulties for designers in the art both at home and abroad.

The inventor also found that the axial plunger motor pump has another disadvantage: as the pressure of the high-pressure system rises, the volumetric efficiency will decrease linearly. There are three reasons for this. First, after years of tests, it is found that with the increase of oil pressure in the hydraulic motor pump system, the side of motor box that bears high pressure is gradually stretched and deformed (which is an inevitable reflection of the elastic modulus of the material), resulting in slight bending of the box. The deflection of intermediate shaft cannot be designed too large, otherwise the life factor of the shaft will be affected, and then the relative position of the cylinder block cannot change synchronously with the deformation of the box. As a result of this pair of contradictions, the contact surface between the oil distribution plate and the cylinder block gradually has a clearance formed therein with the increase of the system oil pressure, and the high-pressure oil leaks rapidly along this clearance. Second, internal leakage is caused by a large fit gap between the plunger and a plunger hole of the cylinder block. Plunger pump designers at home and abroad have always been trying to reduce this fit gap. However, a pair of contradictions have become a design difficulty: the sliding friction coefficient of the plunger in the plunger hole of the cylinder block is about 0.02, and the friction power consumption is high. Moreover, the plunger is wrapped by the cylinder block, so the heat dissipation environment is poor, and for the heat generated during the sliding process, a heat dissipation speed of the plunger is lower than a heat dissipation speed of the cylinder block, which makes a linear expansion speed of the plunger faster, resulting in the gradual reduction of the fit gap between the plunger and the plunger hole of the cylinder block until a state in which the plunger is stuck in the plunger hole of the cylinder block. As to how to avoid this situation, till now, the method is to increase the fit gap between the plunger and the plunger hole of the cylinder block, so that more hydraulic oil leakage can take away the heat. The third is the shrinkage loss of hydraulic oil. There has always been a problem with the axial plunger type variable displacement hydraulic motor pump: except for the maximum displacement condition, a stroke of the plunger cannot move to the bottom of the plunger hole of the cylinder block, and the smaller the displacement is, the farther the bottom of the plunger will be from the bottom of the plunger hole. Therefore, with the increase of the oil pressure, the hydraulic oil will be compressed in this cavity, and the hydraulic motor pump will not be able to operate according to the ideal displacement, resulting in volume loss and affecting the total efficiency.

In view of the above, the present application provides an oblique-axis plunger type variable displacement hydraulic motor pump, which includes:

a box, at which a large variable displacement ball connecting rod assembly and a small variable displacement ball connecting rod assembly are installed;

a multi-stage raceway bearing ring, which is embedded at one end of the box;

a multi-stage raceway ball hinge shaft, which is supported at the multi-stage raceway bearing ring, a plurality of ball hinges being arranged in a circumferential direction at one end face of the multi-stage raceway ball hinge shaft;

a multi-stage rolling body retainer, which is arranged between the multi-stage raceway bearing ring and the multi-stage raceway ball hinge shaft, and in which rolling bodies are installed; the rolling bodies, the multi-stage raceway bearing ring and the multi-stage raceway ball hinge shaft forming a rolling bearing which is configured to have a self-centering operation performance mainly bearing an axial force;

a box shaft, which is installed in the box and located behind the multi-stage raceway ball hinge shaft;

a bush bearing ring, which is installed at a rear end of the box shaft and hinged with the large variable displacement ball connecting rod assembly;

a box end cap, which is installed in the box at an end that is not provided with the multi-stage raceway ball hinge shaft, an inner surface of the box end cap being an arc surface;

an oil distribution plate; in which one end of the oil distribution plate is embedded with a suspension ring, which is configured to provide a complete lubricating oil film at a partition wall for high and low pressures of the oil distribution plate, and which is further configured to prevent a hydraulic oil in a high pressure oil chamber of the oil distribution plate from flowing into a low pressure oil chamber; another end of the oil distribution plate is a circular arc surface that matches the arc surface of the box end cap; and a lower end of the oil distribution plate has a ball hinge, which forms a hinge with the small variable displacement ball connecting rod assembly;

a cylinder block, which is connected with the oil distribution plate through a needle bearing and a pin shaft of the oil distribution plate at an inner hole thereof; in which a bearing ring is sleeved over an outer side of the cylinder block, is connected with the bush bearing ring through a retainer and rolling bodies, and is supported at the box shaft; a thrust bearing ring is installed at an end face of the cylinder block, and is supported at the oil distribution plate through a retainer and rolling bodies; a plurality of holes are provided in a circumferential direction of the cylinder block, and the number of the plurality of holes matches the number of the plurality of ball hinges of the multi-stage raceway ball hinge shaft; each hole includes a corresponding linear bearing hole and plunger hole; each linear bearing hole is used to install a corresponding heavy-load linear rolling bearing, and each plunger hole is used to install a corresponding plunger; each plunger is installed therein with a plunger ball hinge, and each plunger is supported by the heavy-load linear rolling bearing; both ends of each heavy-load linear rolling bearing are assembled with reversers to multiply the number of raceways and improve a load-bearing density; and a plurality of ball connecting rods, which are mated with the plurality of ball hinges of the multi-stage raceway ball hinge shaft; in which one end of each ball connecting rod is press-fitted at the multi-stage raceway ball hinge shaft through a return disc, and forms a hinge with the corresponding ball hinge; the other end of each ball connecting rod is hinged with the plunger through the corresponding plunger ball hinge, fixed with a hole elastic stop ring through a nested sleeve in the plunger, and is integrally installed into an inner hole of the corresponding heavy-load linear rolling bearing and the interior of the plunger hole of the cylinder block;

a swing center of the oil distribution plate is arranged near a shaft end quadrant point of the plunger ball connecting rod ball hinge.

Optionally, the large variable displacement ball connecting rod assembly includes a large variable displacement ball connecting rod, a secondary large variable displacement plunger, a primary large variable displacement plunger, a large variable displacement plunger oil cylinder and a large variable displacement oil cylinder end cap; a lower end ball head of the large variable displacement ball connecting rod forms a hinge with an upper end ball hinge of the bush bearing ring, and an upper end ball head of the large variable displacement ball connecting rod forms a hinge with the secondary large variable displacement plunger; the secondary large variable displacement plunger and the primary large variable displacement plunger are fitted in a sleeved manner, and are installed together inside the large variable displacement plunger oil cylinder; the large variable displacement plunger oil cylinder is connected with the box through threads, and an upper end of the large variable displacement plunger oil cylinder is connected with the large variable displacement oil cylinder end cap through threads.

Optionally, the small variable displacement ball connecting rod assembly includes a small variable displacement ball connecting rod, a secondary small variable displacement plunger, a primary small variable displacement plunger, a small variable displacement plunger oil cylinder and a small variable displacement oil cylinder end cap; an upper end ball head of the small variable displacement ball connecting rod forms a hinge with a lower end ball hinge of the oil distribution plate, and a lower end ball head of the small variable displacement ball connecting rod forms a hinge with the secondary small variable displacement plunger; the secondary small variable displacement plunger and the primary small variable displacement plunger are fitted in a sleeved manner, and are installed together inside the small variable displacement plunger oil cylinder; the small variable displacement plunger oil cylinder is connected with the box through threads, and a lower end of the small variable displacement plunger oil cylinder is connected with the small variable displacement oil cylinder end cap through threads.

Optionally, the multi-stage raceway bearing ring has an inclined end face, which is provided with multiple stages of raceways; the multi-stage raceway ball hinge shaft has an inclined end face, which matches the inclined end face of the multi-stage raceway bearing ring and is provided with multiple stages of raceways; the multi-stage rolling body retainer is arranged at the multiple stages of raceways of the multi-stage raceway bearing ring and the multiple stages of raceways of the multi-stage raceway ball hinge shaft, so that at the same time when the multi-stage raceway ball hinge shaft rotates around the axis center, it also bears an axial thrust from the ball connecting rod, and the axial thrust is transmitted from the rolling bodies to a raceway force-bearing surface of the multi-stage raceway bearing ring. At this time, the raceway force-bearing surface deflects by a 33° angle relative to the radial direction of the bearing raceway, and then the raceway force-bearing surface receives a component force from a support force of the axial force of the ball connecting rod; the component force further improves the self-centering rotation accuracy of the multi-stage raceway ball hinge shaft.

Optionally, an end face of the suspension ring is provided with a plurality of end face keys, and both sides of each of the end face keys are provided with a plurality of fine oil holes; the corresponding end face of the oil distribution plate is provided with a plurality of matching end face keyways to seal high pressure oil in the high pressure oil chamber of the oil distribution plate and a high pressure oil chamber of the suspension ring at contact end faces of the suspension ring and the oil distribution plate stage by stage; a bottom of the plunger hole of the cylinder block is provided with a waist-shaped oil hole, and there is a partition wall between two adjacent waist-shaped oil holes.

Optionally, the heavy-load linear rolling bearing has reverse channels, which are stacked with load-bearing raceways at a preset angle; the heavy-load linear rolling bearing has protruding positioning rings, and each reverser has a corresponding positioning ring groove; the reversers at both ends mate with the protruding positioning rings of the heavy-load linear rolling bearing through the corresponding positioning ring grooves to close and penetrate each steel ball channel one by one.

By innovatively designing the geometric shape of the motor shaft and cancelling the inner ring of the bearing, the present application therefore increases the volume of the rolling bodies, avoids the loss of cycling power caused by reduction of the allowable stress of the bearing material due to significantly increasing the numbers of raceways and rolling bodies to increase the load-bearing density, and also improves the manufacturing and working accuracy of the bearing; at the same time, the present application avoids the early wear of individual raceways caused by the uneven stress on the rolling bodies of the bearing due to the change of the force-bearing direction of the motor shaft, thus prolonging the service life of the bearing. By changing the geometric structure of the oil distribution plate and innovatively designing a "suspension ring" part, the present application can provide a complete lubricating oil film at the partition wall for high and low pressures of the oil distribution plate, and at the same time, the hydraulic oil in the high pressure oil chamber of the oil distribution plate is not allowed to flow into the low pressure oil chamber, thus increasing the rotational speed. By cancelling the hinge between the traditional motor shafts as well, the motor shafts are completely disconnected, and a pin shaft of the oil distribution plate and a needle bearing are added to position the cylinder block, so as to ensure that the friction pair of the oil distribution plate and the cylinder block is precisely matched without being affected by external forces, thus reducing internal leakage. By changing the traditional sliding friction between the plunger and the plunger hole of the cylinder block into rolling friction, a "heavy-load linear rolling bearing" part is innovatively designed, which reduces the friction coefficient between the plunger and the plunger hole of the cylinder block by one order of magnitude and reduces the generation of heat. At the same time, a sealing ring with low friction coefficient is designed and added in the middle of the plunger hole of the cylinder block to seal the hydraulic oil from the high pressure side of the plunger hole of the cylinder block; by moving the swing center of the oil distribution plate from a ball center of the traditional center ball hinge to the vicinity of the shaft end quadrant point of the plunger connecting rod ball hinge, the purpose of moving the bottom of the plunger to the bottom of the plunger hole of the cylinder block regardless of the displacement change is achieved, thus improving the volumetric efficiency and the total efficiency.

From the following detailed description of the specific embodiments of the present application in combination with the accompanying drawings, the above and other purposes, advantages and features of the present application will become clearer to those skilled in the art.

DETAILED DESCRIPTION

Figure 1:
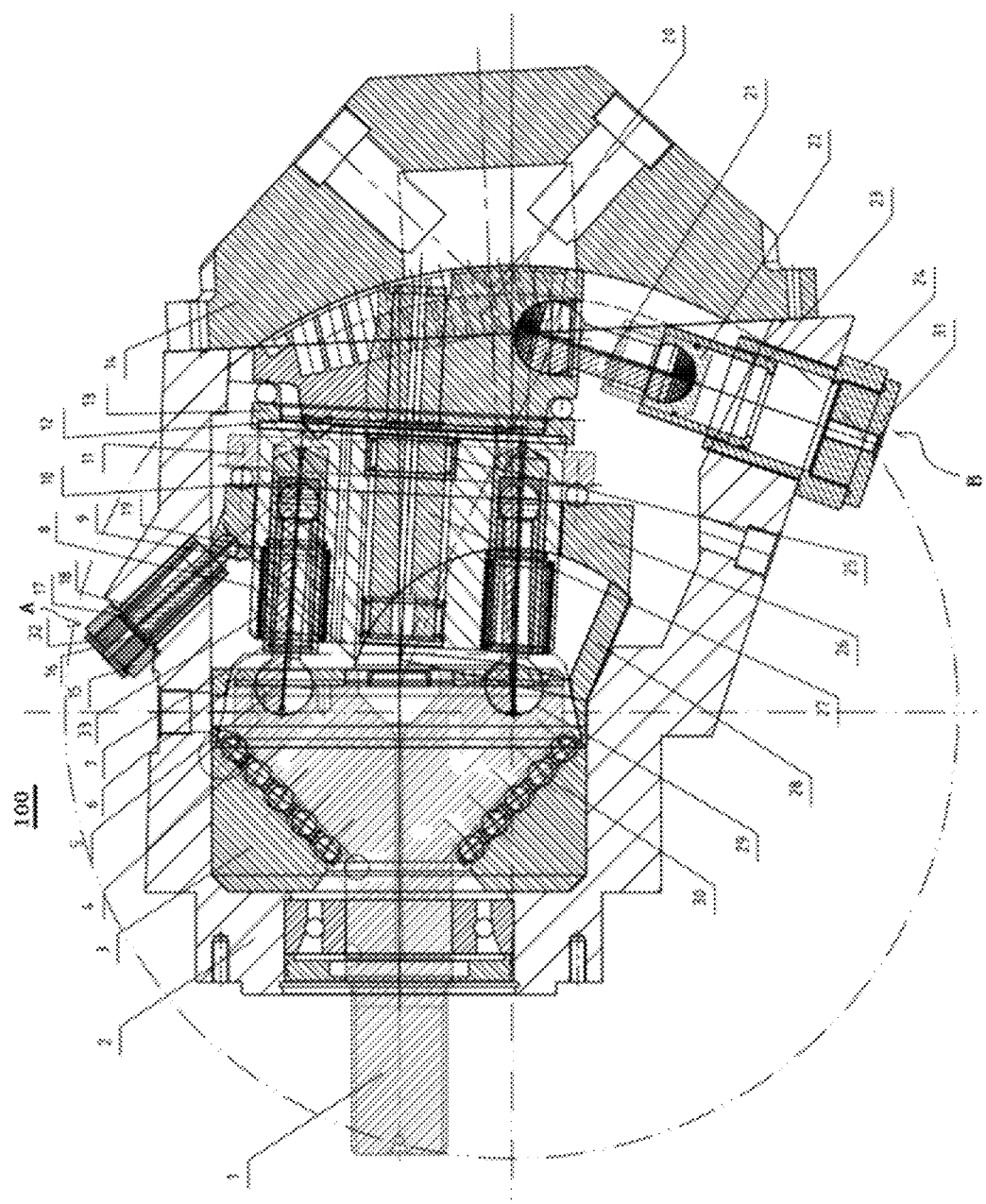
FIG. 1 is a schematic assembly view of an oblique-axis plunger type variable displacement hydraulic motor pump according to an embodiment of the present application in a moving state.

After many years of exploration, evaluation and innovative research and development in many aspects, the following technical routes are finalized by the inventor through tests.

First, a rolling bearing with a special structure is finalized. It is very clear to designers in the art that in order to improve the service life of bearings in a unit limited space, the R&D direction is divided into the development and application of high-performance new materials, the innovation and application of bearing steel heat treatment methods, and the optimization of general bearing design. However, there have always been no significant achievements made in the research and development of these three aspects for reference and application. The technical route of the present application is to optimize the load-bearing capacity of the bearing starting from the inherent characteristics of hydraulic motors and then in combination with the characteristics of rolling bearings, and realize a self-centering operation performance mainly bearing an axial force. The method is to innovatively design the geometric shape of the motor shaft to cancel the inner ring of the bearing, so as to increase the volume of the rolling bodies, avoid the loss of cycling power caused by reduction of the allowable stress of the bearing material due to significantly increasing the numbers of raceways and rolling bodies to increase the load-bearing density, and also improve the manufacturing and working accuracy of the bearing; at the same time, the present application avoids the early wear of individual raceways caused by the uneven stress on the rolling bodies of the bearing due to the change of the force-bearing direction of the motor shaft, since the total deformation amount of the rolling body of the present bearing under the rated load is only tens of nanometers, which is the fundamental reason for improving the service life.

Second, the working process of the axial plunger hydraulic motor pump has an inherent characteristic, which is the phenomenon that odd and even number of plungers work alternately and circularly on the high-pressure oil chamber side of the oil distribution plate. Pressure pulsation caused by this phenomenon brings the contradiction of pressure balancing work to how to balance the contact pressure between the oil distribution plate and the cylinder block. If the contact pressure here is designed too small, it will cause the cylinder block to disengage from the oil distribution plate and make the motor pump stop working when the pulsation is in the valley, and if the contact pressure here is designed too large, it will affect the rotational speed of the motor pump, resulting in premature scorching of the friction surface between the oil distribution plate and the cylinder block. The present application changes the geometric structure of the traditional oil distribution plate and uses the rolling bearing to bear the pressure of the peak of the pulsation, which shares the P value of the friction material on the contact surfaces of the oil distribution plate and the cylinder block, so that the linear speed of this friction pair is preliminarily improved.

Third, it has been proved through many years of experiments that in order to further improve the linear speed of the friction pair of the contact surfaces of the oil distribution plate and the cylinder block, providing a complete lubricating oil film at the partition wall for high and low pressures of the oil distribution plate is a reliable technical route; at the same time, it has become a key issue to prevent the hydraulic oil in the high pressure oil chamber of the oil distribution plate from flowing into the low pressure oil chamber. The present application has changed the structure of traditional oil distribution plate and innovatively designed a "suspension ring" part. After many times of design optimization, the ideal use effect has been achieved, and the rotational speed of the hydraulic motor pump has increased to a new level.

Fourth, in order to correct the defect of internal leakage of the axial plunger type hydraulic motor pump, the present application has changed the traditional design idea and cancelled the hinge between the motor shafts, so that the motor shafts are completely disconnected; moreover, a pin shaft of the oil distribution plate and a needle bearing are added to position the cylinder block, so as to ensure that the friction pair of the oil distribution plate and the cylinder block is precisely matched without being affected by external forces.

Fifth, in order to prevent the high pressure oil from leaking from the fit gap between the plunger and the plunger hole of the cylinder block, the present application has changed the traditional sliding friction between the plunger and the plunger hole of the cylinder block into rolling friction, and innovatively designed a "heavy-load linear rolling bearing" part, which reduces the friction coefficient between the plunger and the plunger hole of the cylinder block by one order of magnitude and reduces the generation of heat. At the same time, a sealing ring with low friction coefficient is designed and added in the middle of the plunger hole of the cylinder block to seal the hydraulic oil from the high pressure side of the plunger hole of the cylinder block. At present, the rated load of linear rolling bearings on the market is generally low, which cannot meet requirements of the working conditions of the present application. In the heavy-load linear rolling bearing of the present application, the reverse channels are overlapped with the load-bearing raceways at a certain angle. At the same time, the protruding positioning rings of the heavy-load linear rolling bearing and the positioning ring grooves of the reverser are precisely matched to form eighteen closed reverse raceways 192. The geometric structure of the ordinary linear bearing is changed, the process design is optimized, the number of raceways is multiplied, and the load-bearing density is increased.

Sixth, in order to correct the defect of the axial plunger type variable displacement hydraulic motor pump that the volumetric efficiency decreases with the increase of oil pressure, the present application has changed the traditional design idea by moving the swing center of the oil distribution plate from a ball center of the traditional center ball hinge to the vicinity of the shaft end quadrant point of the plunger connecting rod ball hinge, so that the purpose of moving the bottom of the plunger to the bottom of the plunger hole of the cylinder block regardless of the displacement change is achieved. The oil distribution plate is designed to be positioned by the box shaft, the bush bearing, the bearing of the oil distribution plate, the large and small variable displacement ball connecting rods and the box end cap.

Figure 2:
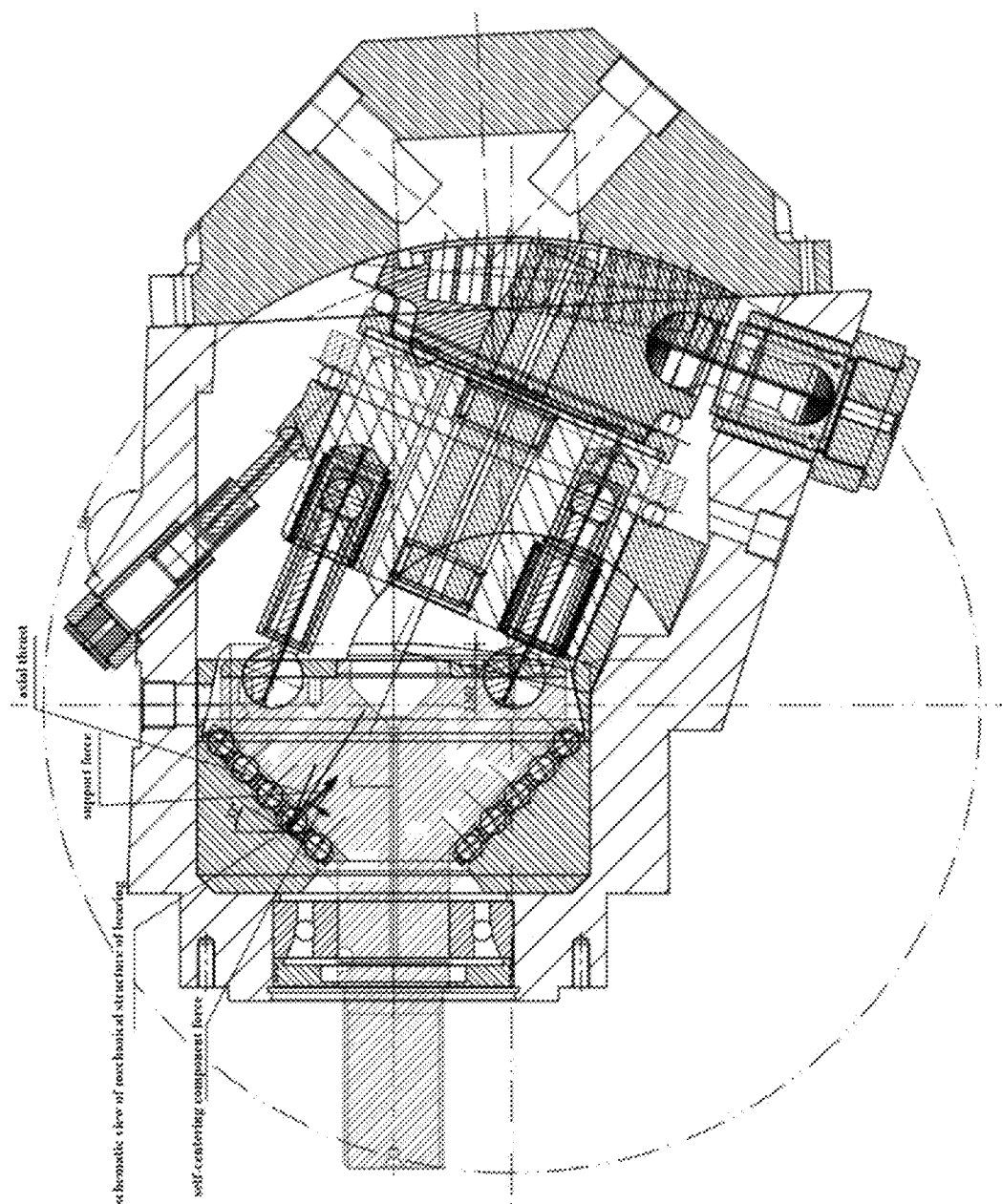
FIG. 2 is a schematic assembly view of the oblique-axis plunger type variable displacement hydraulic motor pump according to an embodiment of the present application in another moving state.

FIG. 1 is a schematic assembly view of an oblique-axis plunger type variable displacement hydraulic motor pump according to an embodiment of the present application in a moving state, and FIG. 2 is a schematic assembly view of the oblique-axis plunger type variable displacement hydraulic motor pump according to an embodiment of the present application in another moving state. As shown in FIG. 1 and also referring to FIG. 2, this embodiment provides an oblique-axis plunger type variable displacement hydraulic motor pump 100, which includes: a box 2, a multi-stage raceway bearing ring 3, a multi-stage raceway ball hinge shaft 1, a multi-stage rolling body retainer 4, a box shaft 28, a bush bearing ring 26, a box end cap 14, an oil distribution plate 20, a cylinder block 8 and a plurality of ball connecting rods 5. A large variable displacement ball connecting rod assembly A and a small variable displacement ball connecting rod assembly B are installed at the box 2. The multi-stage raceway bearing ring 3 is embedded at one end of the box 2. In this embodiment, the multi-stage raceway bearing ring 3 is embedded at a left end inside the box 2. The multi-stage raceway ball hinge shaft 1 is supported at the multi-stage raceway bearing ring 3. A plurality of ball hinges 29 are arranged in a circumferential direction at one end face of the multi-stage raceway ball hinge shaft 1. The multi-stage rolling body retainer 4 is arranged between the multi-stage raceway bearing ring 3 and the multi-stage raceway ball hinge shaft 1. Rolling bodies 30 are installed in the multi-stage rolling body retainer 4. The rolling bodies 30, the multi-stage raceway bearing ring 3 and the multi-stage raceway ball hinge shaft 1 form a rolling bearing which is configured to have a self-centering operation performance mainly bearing an axial force. The box shaft 28 is installed in the box 2 and located behind the multi-stage raceway ball hinge shaft 1. The bush bearing ring 26 is installed at a rear end of the box shaft 28 and hinged with the large variable displacement ball connecting rod assembly A. The box end cap 14 is installed in the box 2 at an end that is not provided with the multi-stage raceway ball hinge shaft 1, and an inner surface of the box end cap 14 is an arc surface. A suspension ring 12 is embedded at a left end of the oil distribution plate 20. The suspension ring 12 is configured to provide a complete lubricating oil film at a partition wall for high and low pressures of the oil distribution plate 20, and is further configured to prevent the hydraulic oil in the high pressure oil chamber of the oil distribution plate 20 from flowing into the low pressure oil chamber. A right end of the oil distribution plate 20 is a circular arc surface that matches the arc surface of the box end cap 14. A lower end of the oil distribution plate 20 has a ball hinge, which forms a hinge with the small variable displacement ball connecting rod assembly B. The cylinder block 8 is connected with the oil distribution plate 20 through a needle bearing 25 and a pin shaft 27 of the oil distribution plate at an inner hole of the cylinder block 8. A bearing ring 11 is sleeved over an outer side of the cylinder block 8, is connected with the bush bearing ring 26 through a retainer and rolling bodies, and is supported on a right side of the box shaft 28. A thrust bearing ring 13 is installed on a right end face of the cylinder block 8, and is supported on a left side of the oil distribution plate 20 through a retainer and rolling bodies. A plurality of holes are provided in a circumferential direction of the cylinder block 8, and the number of the plurality of holes matches the number of the plurality of ball hinges 29 of the multi-stage raceway ball hinge shaft 1. Each hole includes a corresponding linear bearing hole and plunger hole 81; each linear bearing hole is used to install a corresponding heavy-load linear rolling bearing 33, and each plunger hole 81 is used to install a corresponding plunger 7. Each plunger 7 is installed therein with a plunger ball hinge 10, and each plunger 7 is supported by the heavy-load linear rolling bearing 33. Both ends of each heavy-load linear rolling bearing 33 are assembled with reversers 19 to multiply the number of raceways and improve a load-bearing density. In this example, both ends of the heavy-load linear rolling bearing 33 and the reversers 19 are assembled and inserted together into the linear bearing hole at the left end of cylinder block 8. A plurality of ball connecting rods 5 are mated with the plurality of ball hinges 29 of the multi-stage raceway ball hinge shaft 1. One end of each ball connecting rod 5 is press-fitted at the multi-stage raceway ball hinge shaft 1 through a return disc 6, and forms a hinge with the corresponding ball hinge 29. In this example, a ball head on the left side of the ball connecting rod 5 is press-fitted at the right end of the multi-stage raceway ball hinge shaft 1 by a bolt through the return disc 6, and is hinged with the ball hinge 29. The other end of each ball connecting rod 5 is hinged with the plunger 7 through the corresponding plunger ball hinge 10. In this example, the ball head on the right side of the ball connecting rod 5 is inserted into the plunger 7 and hinged with the plunger 7 through the plunger ball hinge 10, fixed with a hole elastic stop ring through a nested sleeve 9 in the plunger, and is integrally installed into an inner hole of the corresponding heavy-load linear rolling bearing 33 and the interior of the plunger hole 81 of the cylinder block 8. A swing center of the oil distribution plate 20 is arranged near a shaft end quadrant point of the plunger ball connecting rod ball hinge.

In specific implementation, the material of the multi-stage raceway ball hinge shaft 1 can be G20Cr2Mn2Mo. The material of the oil distribution plate 20 can be high-strength carburized steel 30CrMnTi. The material of the suspension ring 12 can be copper cladded graphite or carbon fiber.

As shown in FIG. 1, the large variable displacement ball connecting rod assembly A includes a large variable displacement ball connecting rod 18, a secondary large variable displacement plunger 17, a primary large variable displacement plunger 16, a large variable displacement plunger oil cylinder 15 and a large variable displacement oil cylinder end cap 32. A lower end ball head of the large variable displacement ball connecting rod 18 forms a hinge with an upper end ball hinge of the bush bearing ring 26, and an upper end ball head of the large variable displacement ball connecting rod 18 forms a hinge with the secondary large variable displacement plunger 17; the secondary large variable displacement plunger 17 and the primary large variable displacement plunger 16 are fitted in a sleeved manner, and are installed together inside the large variable displacement plunger oil cylinder 15; the large variable displacement plunger oil cylinder 15 is connected with the box 2 through threads, and an upper end of the large variable displacement plunger oil cylinder 15 is connected with the large variable displacement oil cylinder end cap 32 through threads.

As shown in FIG. 1, the small variable displacement ball connecting rod assembly B includes a small variable displacement ball connecting rod 21, a secondary small variable displacement plunger 22, a primary small variable displacement plunger 23, a small variable displacement plunger oil cylinder 24 and a small variable displacement oil cylinder end cap 31. An upper end ball head of the small variable displacement ball connecting rod 21 forms a hinge with a lower end ball hinge of the oil distribution plate 20, and a lower end ball head of the small variable displacement ball connecting rod 21 forms a hinge with the secondary small variable displacement plunger 22; the secondary small variable displacement plunger 22 and the primary small variable displacement plunger 23 are fitted in a sleeved manner, and are installed together inside the small variable displacement plunger oil cylinder 24; the small variable displacement plunger oil cylinder 24 is connected with the box 2 through threads, and a lower end of the small variable displacement plunger oil cylinder 24 is connected with the small variable displacement oil cylinder end cap 31 through threads.

As shown in FIG. 1, the multi-stage raceway bearing ring 3 has an inclined end face, which is provided with multiple stages of raceways; the multi-stage raceway ball hinge shaft 1 has an inclined end face, which matches the inclined end face of the multi-stage raceway bearing ring 3 and is provided with multiple stages of raceways; the multi-stage rolling body retainer 4 is arranged at the multiple stages of raceways of the multi-stage raceway bearing ring 3 and the multiple stages of raceways of the multi-stage raceway ball hinge shaft 1, so that at the same time when the multi-stage raceway ball hinge shaft 1 rotates around the axis center, it also bears an axial thrust from the ball connecting rod, and the axial thrust is transmitted from the rolling bodies to a raceway force-bearing surface of the multi-stage raceway bearing ring 3. At this time, the raceway force-bearing surface deflects by a 33° angle relative to the radial direction of the bearing raceway, and then the raceway force-bearing surface receives a component force from a support force of the axial force of the ball connecting rod; the component force further improves the self-centering rotation accuracy of the multi-stage raceway ball hinge shaft 1.

Figure 3:
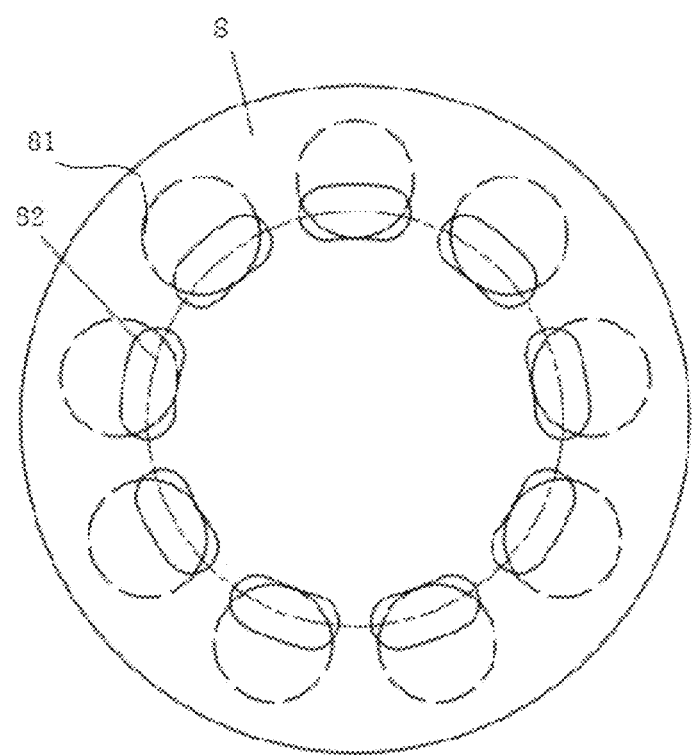
FIG. 3 is a schematic structural view of a cylinder block shown in FIG. 1.
Figure 4:
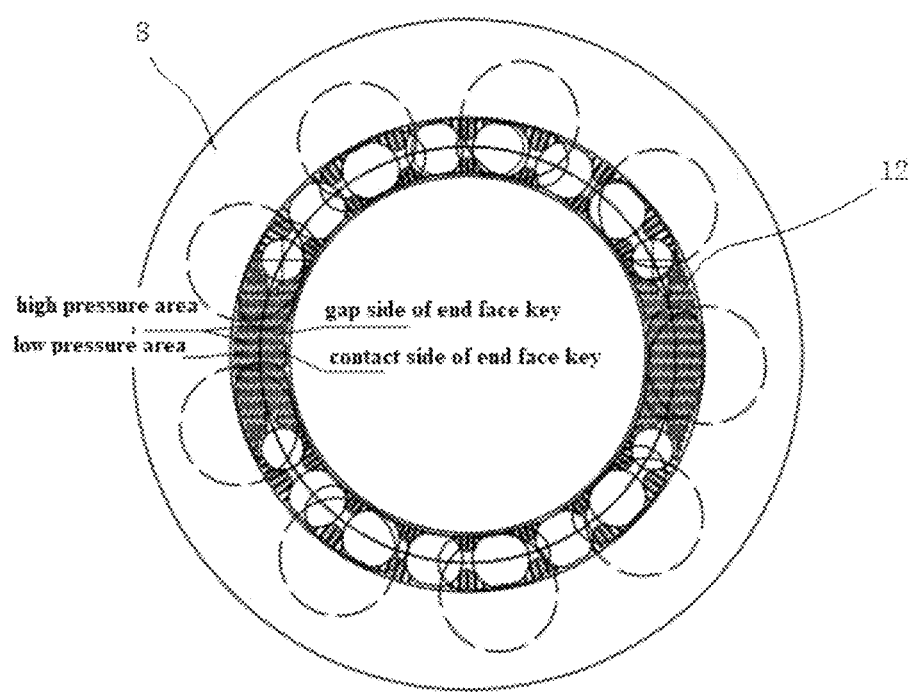
FIG. 4 is a schematic structural view of a friction pair of the cylinder block and a suspension ring shown in FIG. 1 in a working state.
Figure 5:
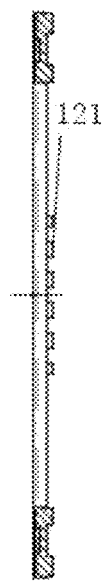
FIG. 5 is a schematic main sectional view of the suspension ring shown in FIG. 1.
Figure 6:
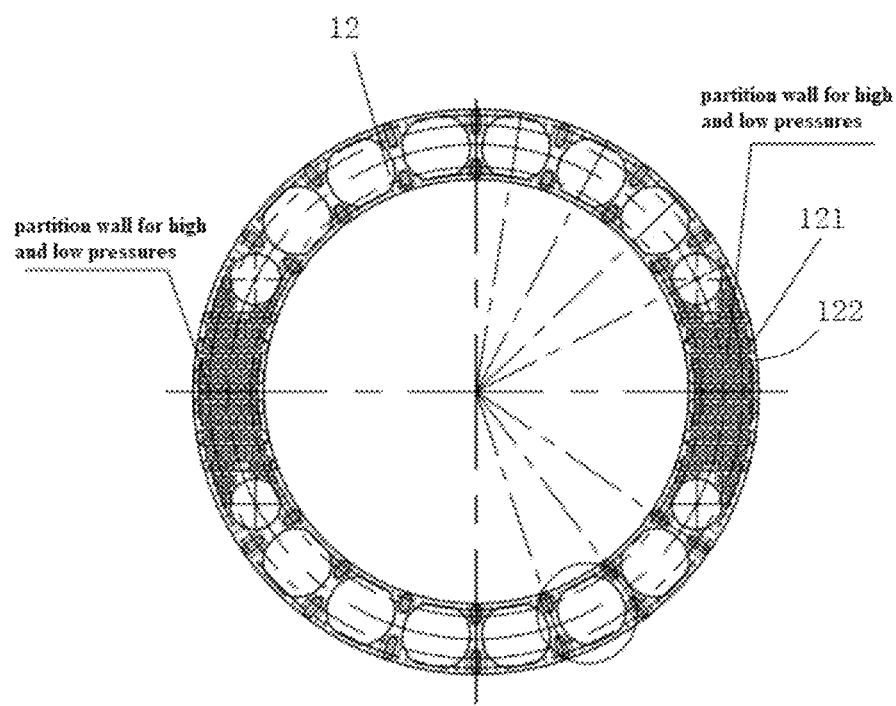
FIG. 6 is a right view of FIG. 5.
Figure 7:
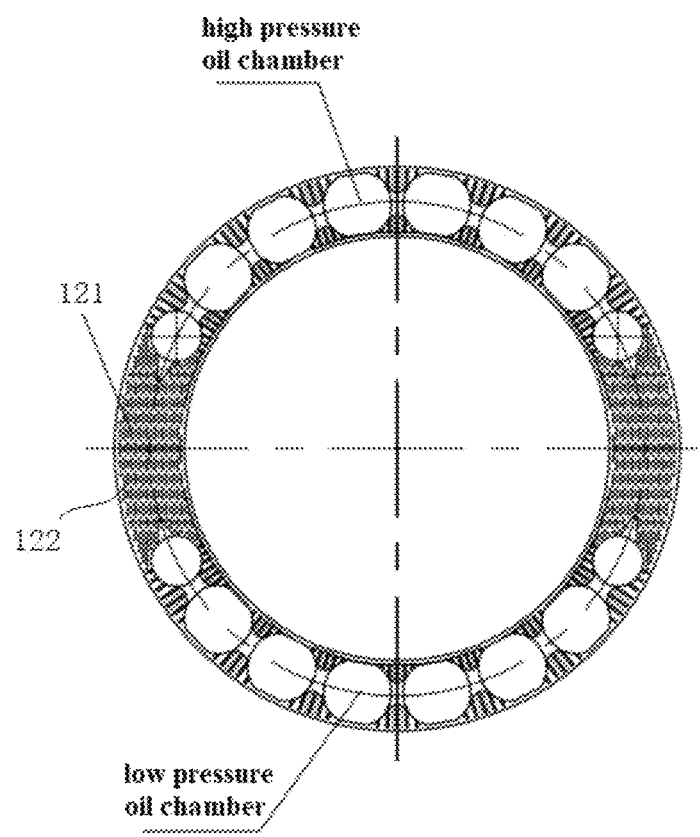
FIG. 7 is a left view of FIG. 5.

FIG. 3 is a schematic structural view of the cylinder block shown in FIG. 1; FIG. 4 is a schematic structural view of a friction pair of the cylinder block and the suspension ring shown in FIG. 1 in a working state; FIG. 5 is a schematic main sectional view of the suspension ring shown in FIG. 1; FIG. 6 is a right view of FIG. 5; and FIG. 7 is a left view of FIG. 5. As shown in FIGS. 5 to 7, an end face of the suspension ring 12 is provided with a plurality of end face keys 121, and both sides of each of the end face keys 121 are provided with a plurality of fine oil holes 122. As shown in FIG. 4, the corresponding end face of the oil distribution plate 20 is provided with a plurality of matching end face keyways to seal high pressure oil in the high pressure oil chamber of the oil distribution plate 20 and the high pressure oil chamber of the suspension ring at contact end faces of the suspension ring 12 and the oil distribution plate 20 stage by stage As shown in FIG. 3, a bottom of the plunger hole 81 of the cylinder block 8 is provided with a waist-shaped oil hole 82, and there is a partition wall between two adjacent waist-shaped oil holes 82.

Figure 8:
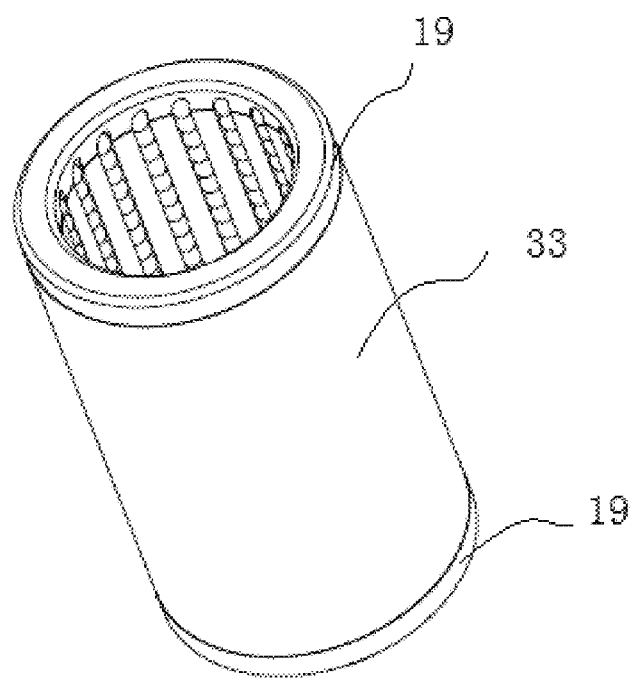
FIG. 8 is a schematic perspective view when a heavy-load linear rolling bearing and a reverser shown in FIG. 1 are assembled together.
Figure 8A:
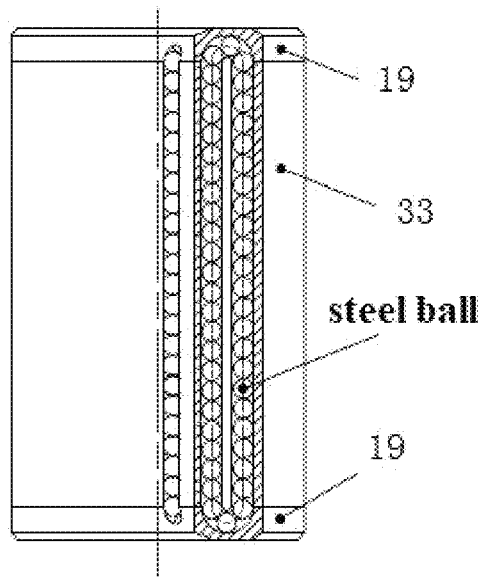
FIG. 8A is a schematic assembly view when the heavy-load linear rolling bearing and the reverser shown in FIG. 8 are assembled together.
Figure 9:
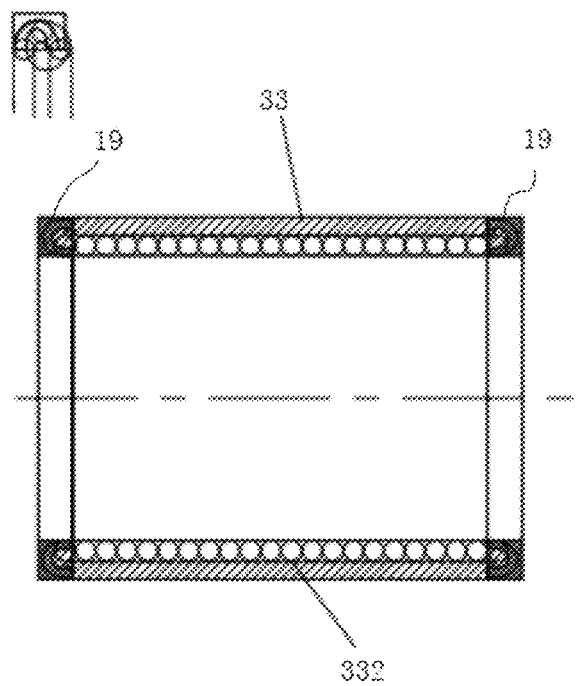
FIG. 9 is a schematic sectional view when the heavy-load linear rolling bearing and the reverser shown in FIG. 1 are assembled together.
Figure 10:
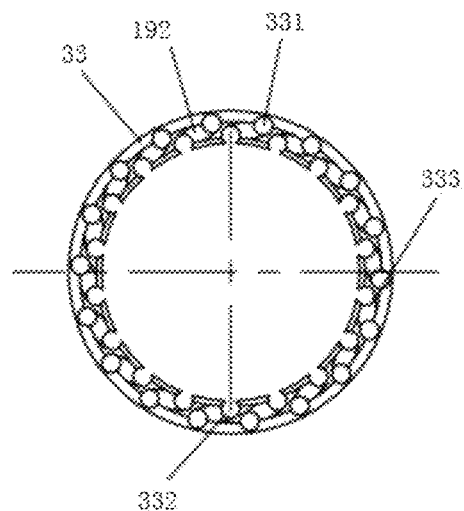
FIG. 10 is a schematic structural view of the heavy-load linear rolling bearing shown in FIG. 1.
Figure 11:
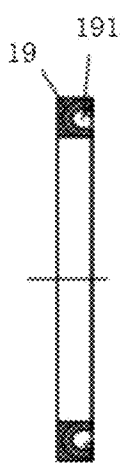
FIG. 11 is a schematic sectional view of the reverser shown in FIG. 1.
Figure 12:
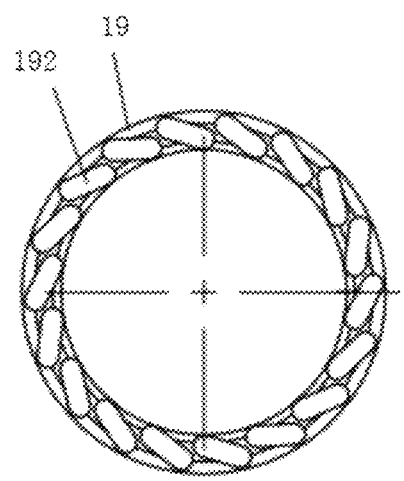
FIG. 12 is a right view of FIG. 11.

FIG. 8 is a schematic perspective view when the heavy-load linear rolling bearing and the reverser shown in FIG. 1 are assembled together; FIG. 8A is a schematic assembly view when the heavy-load linear rolling bearing and the reverser shown in FIG. 8 are assembled together; FIG. 9 is a schematic sectional view when the heavy-load linear rolling bearing and the reverser shown in FIG. 1 are assembled together; FIG. 10 is a schematic structural view of the heavy-load linear rolling bearing shown in FIG. 1; FIG. 11 is a schematic sectional view of the reverser shown in FIG. 1; and FIG. 12 is a right view of FIG. 11. As shown in FIGS. 8 to 8A and also referring to FIGS. 9 to 12, the heavy-load linear rolling bearing 33 has reverse channels 331, which are stacked with load-bearing raceways 332 at a preset angle. The heavy-load linear rolling bearing 33 has protruding positioning rings 333, and each reverser 19 has a corresponding positioning ring groove 191. The reversers 19 at both ends mate with the protruding positioning rings 333 of the heavy-load linear rolling bearing 33 through the corresponding positioning ring grooves 191 to close and penetrate each steel ball channel one by one.

Working Process:

The working process of the present application is similar to that of the traditional oblique-axis type variable displacement hydraulic motor pump. The same parts will not be described in great detail, and the following features will be specifically described herein.

First, as shown in the schematic view of the mechanical structure of the rolling bearing in FIG. 2, at the same time when the multi-stage raceway ball hinge shaft 1 rotates around the axis center, it also bears an axial thrust from the ball connecting rod 5. This thrust is transmitted from the rolling bodies 30 to the raceway force-bearing surface of the multi-stage raceway bearing ring 3. At this time, the raceway force-bearing surface deflects by a 33° angle relative to the radial direction of the bearing raceway. Therefore, the raceway force-bearing surface receives a component force from a support force of the axial force of the ball connecting rod 5, and the component force further improves the self-centering rotation accuracy of the multi-stage raceway ball hinge shaft 1. This function is consistent with the high rigidity design function in which the shaft of the multi-stage raceway ball hinge shaft 1 is integrated with the multi-stage raceway bearing ring 3 and the ball hinge disc, both of which are for ensuring the rotation accuracy of the working process of the rolling bearing. The inventor verified through experiments that the total deformation amount of the multi-stage raceway ball hinge shaft 1 under the rated load has no calculation error, i.e., 0.00015 mm. If the dimensional accuracy and shape and position accuracy, including processing technology, cannot meet the design requirements, then a lower allowable stress standard for high load-bearing density cannot be reached, which will increase the total deformation amount of the bearing to increase the friction coefficient, increase the power consumption, and shorten the service life.

Second, as shown in FIG. 1, a set of thrust ball bearing rings are added at a step surface on the left side of the oil distribution plate 20 to bear a part of the pressure on the right end face of the cylinder block 8. The thrust bearing ring 13 at the oil distribution plate 20 cooperates with the right end of the cylinder block 8 to share the pressure of the cylinder block 8 acting on the left end face of the oil distribution plate 20, so that the suspension ring 12 embedded at the left end of the oil distribution plate 20 reduces the total pressure area. Therefore, the power consumption of the friction pair of the suspension ring 12 and the cylinder block 8 is preliminarily reduced, and the rotational speed of the motor pump is also increased correspondingly.

Third, as shown in the schematic working view of the friction pair of the cylinder block 8 and the suspension ring 12 in FIG. 4, the end face keys 121 on the right side of the suspension ring 12 mate with the end face keyways on the left side of the oil distribution plate 20, and the high pressure oil in the high pressure oil chamber of the oil distribution plate 20 and the high pressure oil chamber of the suspension ring 12 at contact end faces of the suspension ring 12 and the oil distribution plate 20 is sealed stage by stage. The bottom of the plunger hole 81 of the cylinder block 8 is provided with the waist-shaped oil hole 82, and there is a partition wall between two adjacent waist-shaped oil holes 82. In the process of contact friction between the end face of this partition wall and the end face of the partition wall for high and low pressures on the left side of the suspension ring 12, the hydraulic oil in the high pressure area near the high pressure waist-shaped oil hole will pass through the end face keys 121 of the suspension ring 12 and the fine oil holes 122 on the left and right, and as the cylinder block 8 rotates, the hydraulic oil will pass through the gap side of the end face keys 121 of the suspension ring 12 stage by stage and reach the friction surface of the partition wall between the waist-shaped oil holes 82 to establish a complete oil film. The linear speed of the friction pair of the contact surfaces of the suspension ring 12 and the cylinder block 8 is further increased. Due to the pressure effect of this high pressure area, the contact side of the end face keys 121 will be in close contact with the side faces of the end face keyways of the oil distribution plate 20, and therefore the hydraulic oil in the high pressure area communicating with the high pressure oil chamber will not leak into the low pressure area communicating with the low pressure oil chamber.

Fourth, as shown in FIG. 1, the pin shaft 27 of the oil distribution plate passes through the cylinder block 8 without being hinged to the multi-stage raceway ball hinge shaft 1, but two sets of needle bearings 25 are used to ensure the shape and position accuracy of the cylinder block 8 and the oil distribution plate 20. Therefore, when the box 2 is bent and deformed under tension in the working process, the oil distribution plate 20 will slightly deflect by an angle together with the cylinder block 8 synchronously, which will not cause separation of the friction pair of the cylinder block 8 and the oil distribution plate 20 to produce cracks and leak hydraulic oil, thus improving the volumetric efficiency of the present axial plunger type hydraulic motor pump.

Fifth, as shown in FIGS. 8 to 11, the reversers 19 at both ends of the heavy-load linear rolling bearing 33 use the positioning ring grooves 191 to mate with the protruding positioning rings 333 of the heavy-load linear rolling bearing 33 to close and penetrate eighteen steel ball channels one by one.

Sixth, as shown in FIG. 1, the combined parts such as the oil distribution plate 20, the cylinder block 8, the bearing ring 11, the bush bearing ring 26, the pin shaft 27 of the oil distribution plate, the large variable displacement ball hinge 19, the large variable displacement ball connecting rod 18 and the small variable displacement ball connecting rod 21 are driven by the large variable displacement plunger and the small variable displacement plunger to rotate around a center of the concentric circle of the circular arc surface of the box end cap 14 and the circular arc surface of the box shaft 28, thus realizing the variable displacement function. As shown in FIGS. 1 and 2, it can be seen that the plunger 7 can move to the bottom of the plunger hole 81 of the cylinder block 8 regardless of the displacement of the present plunger type variable displacement hydraulic motor pump. Therefore, a cavity where the hydraulic oil of the traditional hydraulic motor pump is compressed is cancelled, thus improving the volumetric efficiency and total efficiency of the present plunger type variable displacement hydraulic motor pump.

Hitherto, it should be recognized by those skilled in the art that although several exemplary embodiments of the present application have been shown and described in detail herein, many other variations or modifications that follow the principles of the present application can still be directly determined or derived according to the contents disclosed in the present application without departing from the spirit and scope of the present application. Therefore, the scope of present application should be understood and recognized as covering all these other variations or modifications

What is claimed is:

1. An oblique-axis plunger variable displacement hydraulic motor pump, comprising:
    a box, at which a large variable displacement ball connecting rod assembly and a small variable displacement ball connecting rod assembly are installed;
    a multi-stage raceway bearing ring, which is embedded at one end of the box;
    a multi-stage raceway ball hinge shaft, which is supported at the multi-stage raceway bearing ring, a plurality of ball hinges arranged in a circumferential direction at one end face of the multi-stage raceway ball hinge shaft;
    a multi-stage rolling body retainer, which is arranged between the multi-stage raceway bearing ring and the multi-stage raceway ball hinge shaft, and in which rolling bodies are installed; wherein the rolling bodies, the multi-stage raceway bearing ring and the multi-stage raceway ball hinge shaft form a rolling bearing which is configured to have a self-centering operation performance mainly bearing an axial force;
    a box shaft, which is installed in the box and located behind the multi-stage raceway ball hinge shaft;
    a bush bearing ring, which is installed at a rear end of the box shaft and hinged with the large variable displacement ball connecting rod assembly;
    a box end cap, which is installed in the box at an end that is not provided with the multi-stage raceway ball hinge shaft, an inner surface of the box end cap is an arc surface;
    an oil distribution plate, wherein one end of the oil distribution plate is embedded with a suspension ring which is configured to provide a complete lubricating oil film at a partition wall for high and low pressures of the oil distribution plate, and which is further configured to prevent a hydraulic oil in a high pressure oil chamber of the oil distribution plate from flowing into a low pressure oil chamber; another end of the oil distribution plate is a circular arc surface that matches the arc surface of the box end cap; and a lower end of the oil distribution plate has a ball hinge, which forms a hinge with the small variable displacement ball connecting rod assembly;
    a cylinder block, which is connected with the oil distribution plate through a needle bearing and a pin shaft of the oil distribution plate at an inner hole thereof; wherein a bearing ring is sleeved over an outer side of the cylinder block, is connected with the bush bearing ring through a retainer and rolling bodies, and is supported at the box shaft; a thrust bearing ring is installed at an end face of the cylinder block, and is supported at the oil distribution plate through a retainer and rolling bodies; a plurality of holes are provided in a circumferential direction of the cylinder block, and the number of the plurality of holes matches the number of the plurality of ball hinges of the multi-stage raceway ball hinge shaft; each hole comprises a corresponding linear bearing hole and plunger hole; each heavy-load linear rolling bearing is located within a corresponding linear bearing hole, and each plunger is located within a corresponding plunger hole; each plunger is installed therein with a plunger ball hinge, and each plunger is supported by the heavy-load linear rolling bearing; both ends of each heavy-load linear rolling bearing are assembled with reversers to multiply the number of raceways and improve a load-bearing density; and
    a plurality of ball connecting rods, which are mated with the plurality of ball hinges of the multi-stage raceway ball hinge shaft; wherein one end of each ball connecting rod is press-fitted at the multi-stage raceway ball hinge shaft through a return disc, and forms a hinge with the corresponding ball hinge; the other end of each ball connecting rod is hinged with the plunger through the corresponding plunger ball hinge, fixed with a hole elastic stop ring through a nested sleeve in the plunger, and is integrally installed into an inner hole of the corresponding heavy-load linear rolling bearing and the interior of the plunger hole of the cylinder block.

2. The oblique-axis plunger variable displacement hydraulic motor pump according to claim 1, wherein the large variable displacement ball connecting rod assembly comprises a large variable displacement ball connecting rod, a secondary large variable displacement plunger, a primary large variable displacement plunger, a large variable displacement plunger oil cylinder and a large variable displacement oil cylinder end cap; a lower end ball head of the large variable displacement ball connecting rod forms a hinge with an upper end ball hinge of the bush bearing ring, and an upper end ball head of the large variable displacement ball connecting rod forms a hinge with the secondary large variable displacement plunger; the secondary large variable displacement plunger and the primary large variable displacement plunger are fitted in a sleeved manner, and are installed together inside the large variable displacement plunger oil cylinder; the large variable displacement plunger oil cylinder is connected with the box through threads, and an upper end of the large variable displacement plunger oil cylinder is connected with the large variable displacement oil cylinder end cap through threads.

3. The oblique-axis plunger variable displacement hydraulic motor pump according to claim 1, wherein the small variable displacement ball connecting rod assembly comprises a small variable displacement ball connecting rod, a secondary small variable displacement plunger, a primary small variable displacement plunger, a small variable displacement plunger oil cylinder and a small variable displacement oil cylinder end cap; an upper end ball head of the small variable displacement ball connecting rod forms a hinge with a lower end ball hinge of the oil distribution plate, and a lower end ball head of the small variable displacement ball connecting rod forms a hinge with the secondary small variable displacement plunger; the secondary small variable displacement plunger and the primary small variable displacement plunger are fitted in a sleeved manner, and are installed together inside the small variable displacement plunger oil cylinder; the small variable displacement plunger oil cylinder is connected with the box through threads, and a lower end of the small variable displacement plunger oil cylinder is connected with the small variable displacement oil cylinder end cap through threads.

4. The oblique-axis plunger variable displacement hydraulic motor pump according to claim 1, wherein the multi-stage raceway bearing ring has an inclined end face, which is provided with multiple stages of raceways; the multi-stage raceway ball hinge shaft has an inclined end face, which matches the inclined end face of the multi-stage raceway bearing ring and is provided with multiple stages of raceways; the multi-stage rolling body retainer is arranged at the multiple stages of raceways of the multi-stage raceway bearing ring and the multiple stages of raceways of the multi-stage raceway ball hinge shaft, so that at the same time when the multi-stage raceway ball hinge shaft rotates around the axis center, it also bears an axial thrust from the ball connecting rod, and the axial thrust is transmitted from the rolling bodies to a raceway force-bearing surface of the multi-stage raceway bearing ring; at this time, the raceway force-bearing surface deflects by a 33° angle relative to the radial direction of the bearing raceway, and then the raceway force-bearing surface receives a component force from a support force of the axial force of the ball connecting rod; the component force further improves the self-centering rotation accuracy of the multi-stage raceway ball hinge shaft.

5. The oblique-axis plunger variable displacement hydraulic motor pump according to claim 1, wherein an end face of the suspension ring is provided with a plurality of end face keys, and both sides of each of the end face keys are provided with a plurality of fine oil holes; the corresponding end face of the oil distribution plate is provided with a plurality of matching end face keyways to seal high pressure oil in the high pressure oil chamber of the oil distribution plate and a high pressure oil chamber of the suspension ring at contact end faces of the suspension ring and the oil distribution plate stage by stage; a bottom of each of the plunger holes of the cylinder block is provided with a waist-shaped oil hole, and there is a partition wall between two adjacent waist-shaped oil holes.

6. The oblique-axis plunger variable displacement hydraulic motor pump according to claim 1, wherein each of the heavy-load linear rolling bearings has reverse channels, which are stacked with load-bearing raceways at a preset angle; the heavy-load linear rolling bearing has protruding positioning rings, and each reverser has a corresponding positioning ring groove; the reversers at both ends mate with the protruding positioning rings of the heavy-load linear rolling bearing through the corresponding positioning ring grooves to close and penetrate each channel one by one.

* * * * *